United States Patent [19]
Radloff et al.

[11] Patent Number: 5,768,099
[45] Date of Patent: Jun. 16, 1998

[54] COMPUTER WITH AN IMPROVED DISK DRIVE MOUNTING ASSEMBLY

[75] Inventors: Timothy Radloff; Erica Scholder, both of Austin, Tex.

[73] Assignee: Dell Computer Corporation, Austin, Tex.

[21] Appl. No.: 785,416

[22] Filed: Jan. 23, 1997

[51] Int. Cl.$^6$ ................................ G06F 1/16; H05K 7/14
[52] U.S. Cl. ................ 361/685; 361/725; 360/137 D
[58] Field of Search ............................ 361/683, 684, 361/685, 686, 724–727; 360/137 D, 900, 97.01, 98.01; 312/223.1, 223.2; 248/346, 672, 581

[56] References Cited

U.S. PATENT DOCUMENTS

| | | |
|---|---|---|
| 4,924,355 | 5/1990 | Mitchell et al. . |
| 5,036,481 | 7/1991 | Lunsford et al. . |
| 5,136,466 | 8/1992 | Remise et al. ............. 361/685 |
| 5,136,468 | 8/1992 | Wong et al. ............. 361/685 |
| 5,138,525 | 8/1992 | Rodriguez . |
| 5,195,022 | 3/1993 | Hoppal et al. ............. 361/685 |
| 5,306,079 | 4/1994 | Liu ............................ 312/223.2 |
| 5,317,483 | 5/1994 | Swindler . |
| 5,337,464 | 8/1994 | Steffes . |
| 5,438,476 | 8/1995 | Steffes . |
| 5,513,329 | 4/1996 | Pecone . |
| 5,544,006 | 8/1996 | Radloff et al. . |
| 5,566,049 | 10/1996 | Nguyen ..................... 361/685 |
| 5,568,610 | 10/1996 | Brown . |
| 5,575,546 | 11/1996 | Radloff . |
| 5,583,716 | 12/1996 | Akiba et al. ............. 360/99.01 |
| 5,590,024 | 12/1996 | Honda et al. ............. 361/684 |
| 5,600,538 | 2/1997 | Xanthopoulos ............. 361/683 |
| 5,600,801 | 2/1997 | Parks et al. . |
| 5,604,871 | 2/1997 | Pecone . |

Primary Examiner—Lynn D. Feild
Attorney, Agent, or Firm—Haynes and Boone, L.L.P.

[57] ABSTRACT

A computer, or other similar type of electronic device including a chassis, and one or more disk drives mounted in the chassis. A mounting bracket for receiving a disk drive is mounted to the computer chassis and is precisely located relative to a wall of the chassis. A mounting plate for receiving another disk drive is mounted relative to the bracket and to the chassis and is also precisely located relative to a wall of the chassis and to the bracket.

14 Claims, 4 Drawing Sheets

COMPUTER WITH AN IMPROVED DISK DRIVE MOUNTING ASSEMBLY

TECHNICAL FIELD

The invention relates generally to the field of computers, and more particularly to a computer having a disk drive and an assembly for mounting the disk drive in the chassis of the computer.

BACKGROUND

Virtually all types of computers include one or more disk drives which are mounted in the computer chassis. Currently, the two most common floppy disk drives that are used are drives for 3.5 inch floppy disks and drives for CD-ROM, each of which includes a housing which contains the drive components and which is usually mounted to the chassis. If both a 3.5 floppy disk drive and a CD ROM drive are utilized they are usually mounted in the same general area of the chassis with one extending immediately above the other.

There are two basic design approaches for mounting these types of drives to the computer chassis. One approach involves inserting mounting screws through side mounting holes of the drive bay which is an integral part of the computer chassis. However, if a wide variety of drives from different manufacturers must be accommodated, problems arise since all of the drives do not have the same dimensions and tolerances. Thus, when drives have dimensions slightly less than the corresponding specified dimensions in the chassis, gaps extend around the drives which detract from the cosmetic quality of the installation. Also, since most drive bays are assembled components of the chassis and since the drive bays themselves often vary slightly in size, the gaps can be increased. Also, this mounting process utilizing a plurality of screws is difficult and slow from an assembly standpoint and, of course, requires several additional parts (screws).

The other approach for mounting disk drives in a computer chassis involves intermediate brackets or drive rails that are assembled to the drives. According to this technique, the drive, with the brackets or drive rail secured thereto, is slid in from the front of the chassis and either snapped or screwed in place. In the case of side-mounted rails, it is very difficult to assemble these rails in a consistent position to the drive even with the use of fixturing. Also, if the brackets or rails are side-mounted to the drives, the variance in dimension of the drives also presents the space tolerance problems discussed above, which sometimes results in the drive floating from side to side. Further, if the drive, with the attached brackets or rails, is snapped in the chassis, there must be sufficient front-to-back clearance to accommodate all the possible tolerance buildup caused by the variability of the drive brackets and the drive bays, as well as assembly tolerances. Of course, if the drive, with the attached brackets or rails is screwed in the chassis, it gives rise to the same problems set forth above.

Therefore, what is needed is a computer having a drive mounting assembly that enables a disk drive to be installed quickly, yet results in a high-quality cosmetic finish that minimizes the build-up of gaps around the drive.

SUMMARY

Accordingly, an embodiment of the present invention is directed to a computer having a mounting bracket mounted to the computer chassis and precisely located relative to a wall of the chassis. A mounting plate is mounted relative to the bracket and to the chassis and is also precisely located relative to a wall of the chassis and to them bracket. Disk drive units, such as floppy disk drives or CD ROM drives can be mounted to the bracket and/or to the mounting plate.

Advantages are thus achieved with the above since the disk drives can be quickly mounted and precisely located in the chassis while minimizing space tolerance build-up and maintaining a high-quality cosmetic finish.

DETAILED DESCRIPTION OF THE PREFERRED EMBODIMENT

Figure 1:
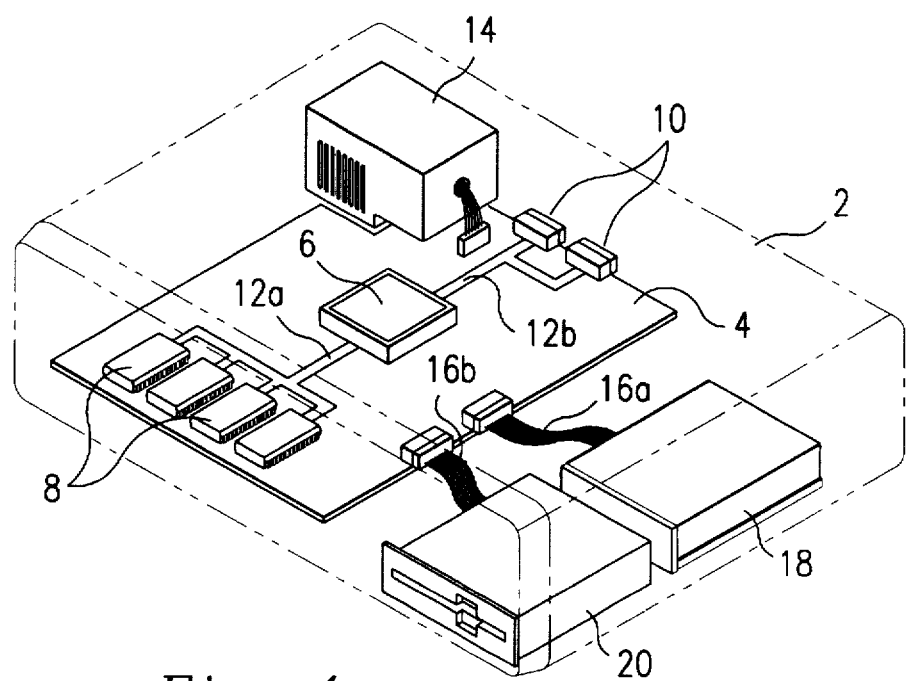
FIG. 1 is an isometric view of an embodiment of the computer of the present invention.

FIG. 1 depicts a personal computer according to the present invention which can be in the form of a desktop computer, a laptop computer or a tower computer. The personal computer includes a chassis 2 in which a motherboard 4 is mounted. A processor 6, a plurality of memory devices or modules 8, and two input/output (I/O) devices 10 are mounted on the motherboard 4. Two buses 12a and 12b are also provided on the motherboard 4 that connect the processor 6 to the memory modules 8 and to the input/output devices 10, respectively. A power supply 14 is connected to the motherboard 4 and a pair of cable assemblies 16a and 16b connect the power supply to a hard drive unit 18 and a disk drive unit 20, respectively. It is understood that other components, electrical traces, electrical circuits and related devices (not shown) are provided in the chassis 2. Since these are all conventional, they will not be described in any further detail.

Figure 2:
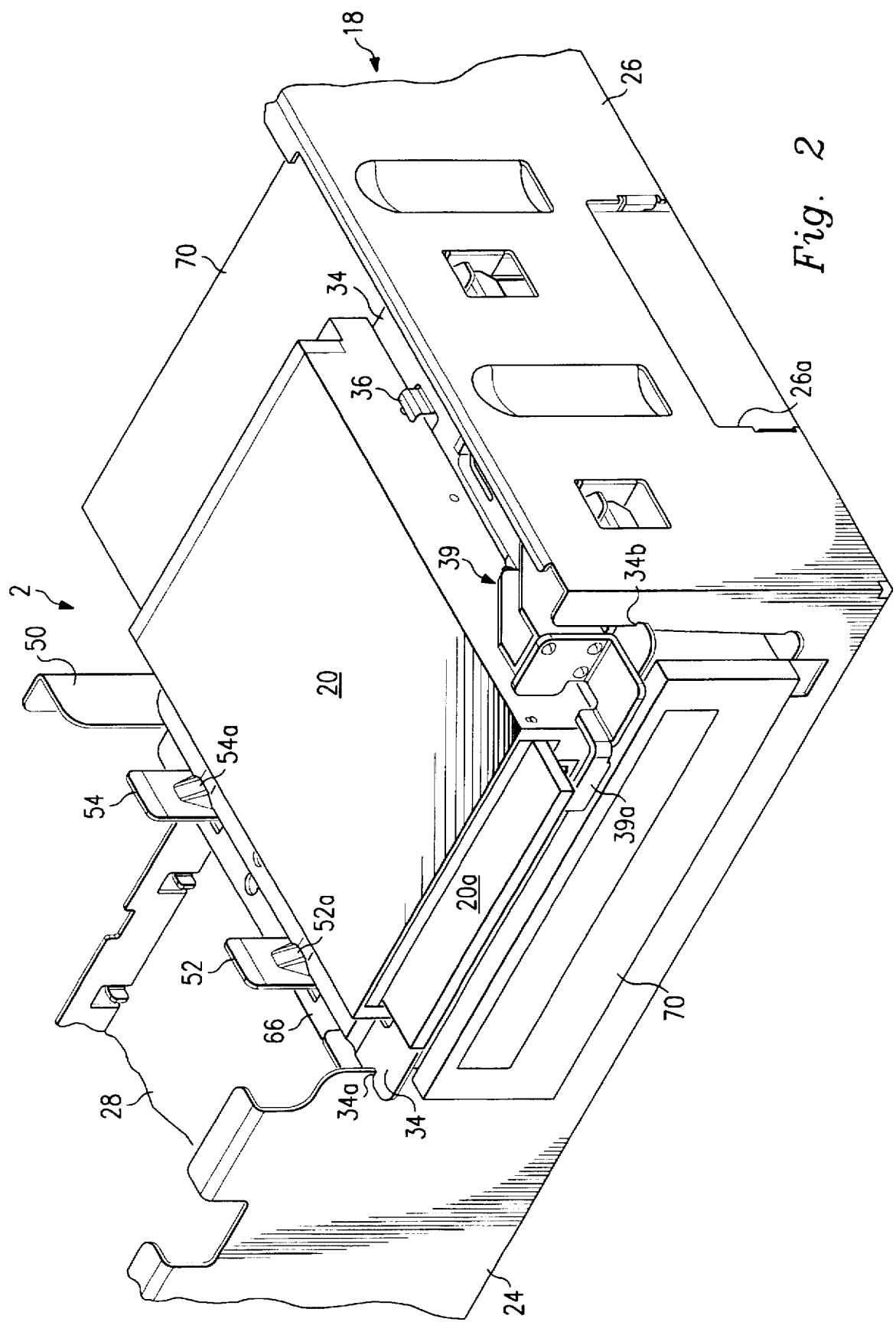
FIG. 2 is a partial enlarged isometric view of a portion of the computer of FIG. 1, viewed from the front of the computer.
Figure 3:
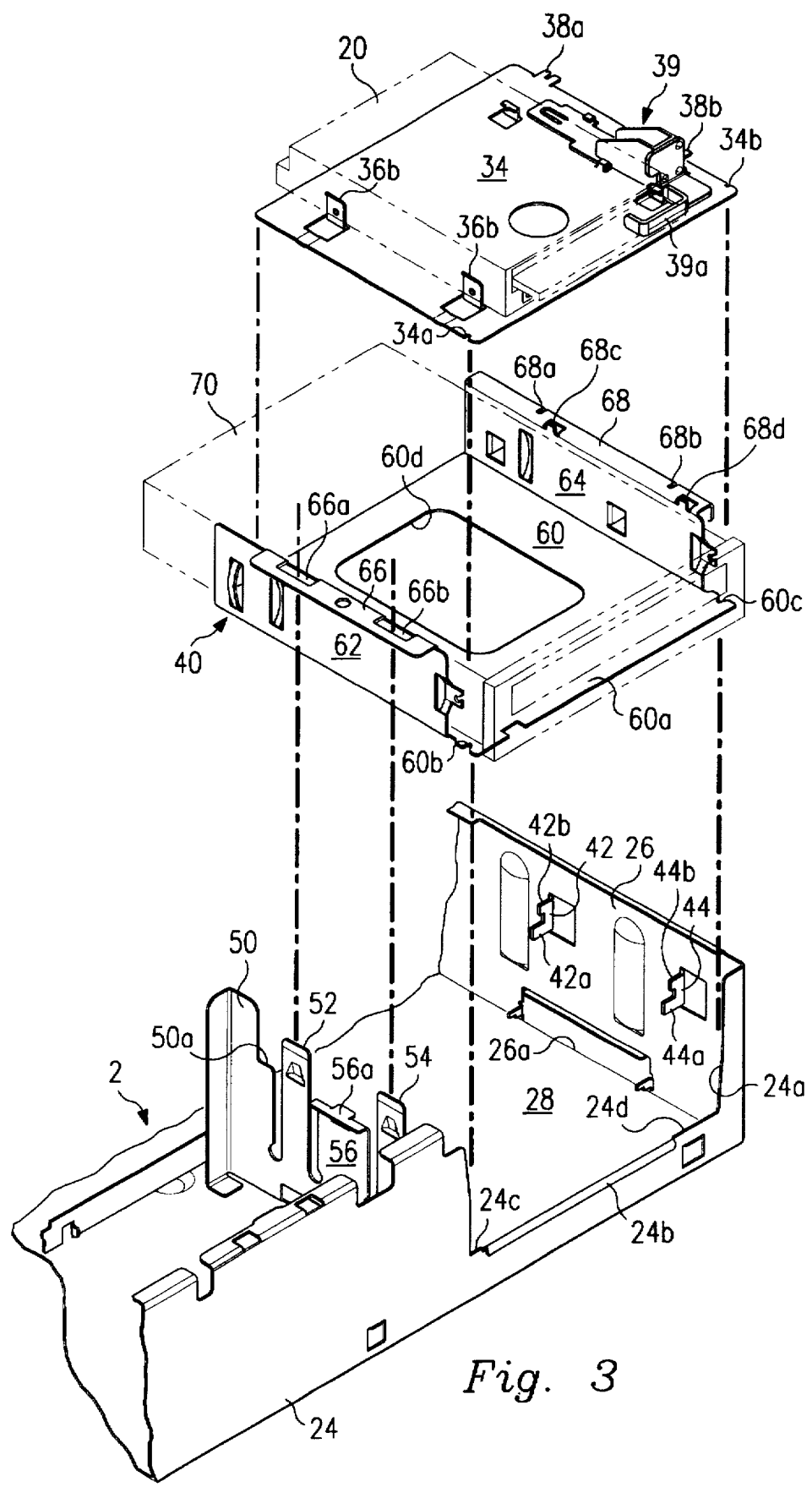
FIG. 3 is a reduced, exploded view of the computer portion of FIGS. 1 and 2.

Referring to FIGS. 2 and 3 of the drawings, the chassis 2 is formed by a front wall 24, a side wall 26, and a bottom wall, or base, 28 (FIG. 3). Although not shown in FIGS. 2 and 3 for the convenience of presentation, it is understood that the chassis 2 also includes another side wall, a rear wall and an outer enclosure that extends over the chassis 2 and includes a cover. The chassis 2, as well as the mounting assembly to be described, is preferably fabricated from sheet metal and the outer enclosure from plastic. A slot 24a (FIG. 3) is formed in the front wall 24 adjacent the side wall 26, and a lip 24b is formed on the surface of the front wall 24 defining the lower portion of the slot Two ledges 24c and 24d extend to either side of the lip 24b for reasons to be described.

The disk drive unit 20 is disposed in the chassis 2 adjacent the front wall 24 and the side wall 26 and is adapted to receive and drive a disk 20a in a conventional manner. The disk 20a can be in the form of a floppy disk of any standard size. The drive unit 20 is supported in the chassis 2 by a support plate 34 having a plurality of tabs 36a (one of which is shown in FIG. 2) which extend upwardly from the support plate 34 as viewed in FIG. 2 and into slots or openings formed in the side wall of the drive unit 20. Two other tabs engage, and are fastened to, the other side wall (not shown in FIGS. 2 and 3) of the drive unit 20 and will be described later.

As shown in FIG. 3, two spaced, notched tabs 38a and 38b extend from one side edge of the plate 34 and a pair of opposed notches 34a and 34b are formed in the respective side edge portions of the plate near the front end thereof. A slider assembly 39 (FIGS. 2 and 3) is supported on the support plate 34 and includes an arm 39a adapted to engage the eject button of the drive unit 20. Since the slider assembly 39 does not form any portion of the present invention, it will not be described in any further detail.

A bracket 40 is mounted to the chassis 2 and extends between the chassis and the support plate 34. To this end, a pair of U-shaped tabs 42 and 44 extend inwardly from the side wall 26 and are formed by cutting out portions of the side wall and bending the portions inwardly. The tab 42 has a relative long, lower leg 42a as viewed in FIG. 3, and a relatively short upper leg 42b with a notch extending therebetween; and the tab 44 has a relative long, lower leg 44a, and a relatively short upper leg 44b with a notch extending therebetween.

A vertical partition wall 50 is mounted to the bottom wall 28 and the front wall 24 in any known manner and extends from the front wall 24 in a perpendicular relation to the latter wall. The partition wall 50 is slotted as shown to define a ledge 50a and two vertically-extending spaced, elongated, flexible fingers 52 and 54 having bosses 52a and 54a (FIG. 2), respectively formed on their inner surfaces near their upper ends. A center finger 56 (FIG. 3) is also defined by the slots in the partition wall 50 and extends between the fingers 52 and 54. The height of the center finger 56 is less than that of the fingers 52 and 54 and the upper end portion of the finger 56 is bent back to form a horizontal support flange 56a.

The bracket 40 is substantially U-shaped, and includes a bottom plate 60 and two vertically-extending side plates 62 and 64 extending upwardly from, and perpendicular to, the bottom plate. The upper portion of the side plate 62 is bent outwardly to form a flange 66 and two spaced slots 66a and 66b are formed through the latter flange. The upper portion of the side plate 64 is also bent outwardly and downwardly to form an L-shaped flange 68 having two spaced notches 68a and 68b formed therethrough and two tabs 68c and 68d extending upwardly therefrom, for reasons to be explained.

The bottom plate 60 has an extended end portion 60a that extends outwardly from the corresponding ends of the side plates 62 and 64 and two notches 60b and 60c are formed in the opposite side edge portions of the extended portion of the bracket.

Figure 4:
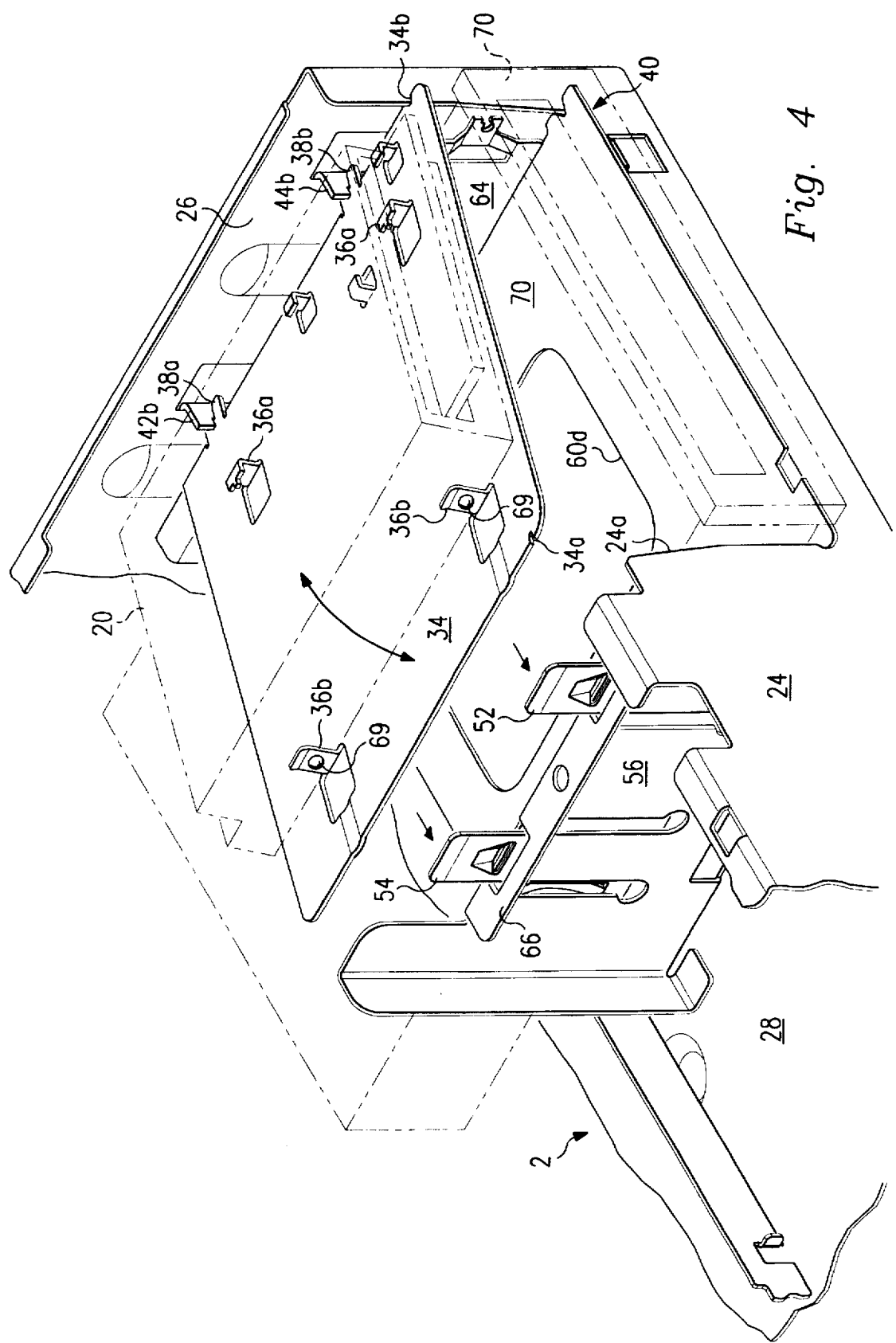
FIG. 4 is a view similar to FIG. 2, but depicting a step of assembling the floppy disk drive to the computer chassis.

As shown in FIG. 4, the tabs 36a (one of which is shown in FIG. 2) engage one side wall of the drive unit 20 and two additional tabs 36b engage the other side wall of the drive unit. Two screws 69 extend through aligned openings formed through the tabs 36b and the latter side wall to secure the tabs 36b to the drive unit 20.

The bracket 40 is mounted and secured in the chassis 2 by lowering the bracket from the position shown in FIG. 3 to the position shown in FIG. 4. In this mounted position, the extended end portion 60a of the bottom plate 60 of the bracket engages, and rests on, the ledges 24c and 24d and lip 24b of the front wall 24. During this lowering movement, the notches in the tabs 68a and 68b (FIG. 8) of the bracket 40 pass over the short legs 42b, 44b of tabs 42 and 44 of the chassis 2 until the lower surfaces of the notches 68a and 68b engage the relatively long legs 42a and 44a of the tabs 42 and 44, respectively. Also, during this lowering movement, the fingers 52 and 54 pass through the slots 66a and 66b, respectively, of the flange 66 of the bracket 40 and the lower surface of the flange 66 of the bracket 40 engages the ledge 56a of the center finger 56 of the chassis 2.

It can be appreciated that, prior to this lowering movement of the bracket 40, the various notches and slots of the latter bracket, as described above, can be visually aligned with the corresponding fingers and structure of the chassis 2. The bracket 40 is thus precisely located horizontally and vertically in the chassis 2, with its bottom plate 60 spaced above the bottom wall 28 of the chassis 2.

The plate 34 is then located relative to the chassis 2 in the position shown in FIG. 4 in which the slider assembly 39 is omitted for the convenience of presentation. In this position, the tabs 38a and 38b engage the tabs 42 and 44, with the corresponding lower surfaces of the plate engaging the tabs 68c and 68d. Also, the notch 34b of the plate engages an edge portion of the front wall 24 defining the slot 24a.

The plate 34 is then pivoted downwardly as indicated by the long arrow in FIG. 4 to the assembled position of FIG. 2. During this movement the side edge of the plate 34 engages the bosses 52a and 54a (FIG. 2) to force the fingers 52 and 54, respectively, in the direction indicated by the two short arrows in FIG. 4. Upon further downward movement of the latter side edge of the plate 34, the plate clears the bosses 52a and 54a and the fingers "snap" back to the assembled position shown in FIG. 2. In this position the edge portion of the plate 34 rests on the flange 66 of the bracket 40 and the lower surfaces of the bosses 52a and 54a extend over the corresponding upper surface of the plate 34. The plate 34 is thus precisely located horizontally and vertically in the chassis 2 and is adapted to receive the drive unit 20 in the manner described above.

As shown in FIGS. 2–4, a second drive unit 70 can be mounted, in a conventional manner, in the space defined by the bracket 40 and the plate 34. This second drive unit 70 can be in the form of another floppy disk drive unit, a CD ROM drive unit, or the like. Although not shown in the drawings, it is understood that openings can be provided through the bottom plate 60 of the bracket 40 and the bottom plate of the drive unit 70 through which screws extend, to fasten the drive unit 70 to the bracket.

In the assembled condition of the drive unit 20 shown in FIG. 2, other components, circuit boards, or the like can be mounted on the space between the bottom plate 28 of the chassis 2 and the plate 60 of the bracket 40. Relatively quick access to these components, circuits boards, or the like is permitted by providing an opening 26a (FIGS. 2 and 3) in the side wall 26. Other tabs, components, slots, etc. shown in the drawings will not be described in detail since they form no part of the present invention.

The plate 34, with or without the drive unit 20 mounted thereto, can be easily removed from its assembled position in the chassis 2 by manually engaging the fingers 52 and 54 and pushing them in the direction shown by the short arrows in FIG. 4. This enables the plate 34 to be pivoted upwardly in the direction indicated by the long arrow until the plate clears the fingers 52 and 54, thus permitting removal of the plate from the chassis 2. Of course, the bracket 40 can then be removed from the chassis 2 by simply lifting it upwardly until it clears the chassis.

Several advantages are thus achieved with the above embodiment since, for example, the bracket 40 does not significantly contribute to the positional tolerance of the drives 20 and 70. Also, the bottom mounting of the drive 20 eliminates tolerances associated with drives of varying widths.

Also, the lateral position of the plate 84, and therefore the drive 20, and the lateral position of the bracket, and therefore the drive 70, are indexed, or located, relative to the front wall 24. Similarly, the vertical position of the bracket 40 is indexed off the ledges 24c and 24d of the front wall 24 of the chassis 2 and the vertical position of the plate 34, and therefore the drive 20 is indexed off of only one portion of the bracket 40, all of which results in relative tight tolerance control. Also the cover (not shown) for the chassis 2, including the openings for the drives 20 and 70 is indexed off of the front wall 24. Further, the flanges 66 and 68 of the bracket 40 have the dual function of mounting the bracket to the chassis 2 and receiving the plate 34 which is mounted relative to the bracket and to the chassis. All these advantages are achieved while enabling the disk drives 20 and 70 to be mounted to the chassis 2 quickly and establishing a high-quality cosmetic finish.

It is understood that variations may be made in the foregoing without departing from the scope of the invention. For example, the present invention is not limited to use with a computer as described above by means of example, but is equally applicable for mounting any electrical component. Also, the number of tabs, flanges and slots described above can be varied.

It is also understood that the embodiment of the assembly of the present invention described above is intended to illustrate rather than limit the invention, and that the mounting assembly can take many other forms and embodiments within the scope of the invention.

What is claimed is:

1. A computer comprising a chassis including a bottom wall and a plurality of upright walls; a processor disposed in the chassis; a memory device disposed in the chassis; a bracket disposed in the chassis, the bracket including a base plate and pair of side plates, the base plate being spaced from the chassis bottom wall and the bracket being supported by opposite ones of the upright walls; and a mounting plate disposed in the chassis, the mounting slate being spaced from the bracket base plate and being supported by the bracket and the opposite ones of the upright walls.

2. The computer of claim 1 further comprising a first disk drive member mounted to the mounting plate.

3. The computer of claim 2 further comprising a second disk drive member secured to the bracket.

4. The computer of claim 1 wherein the upright walls include a side wall, a front wall and a partition wall.

5. The computer of claim 4 wherein the bracket base plate includes an extension supported by the front wall, one of the bracket side plates is supported by the side wall, and the other of the brackets is supported by the partition wall.

6. The computer of claim 5 wherein each of the bracket side plates includes a flange, one flange having notches formed therein and the other flange having slots formed therein.

7. The computer of claim 6 wherein the sidewall includes tabs extending therefrom engaging the notches in the one flange and the partition wall includes fingers engaging the slots in the other flange.

8. The computer of claim 7 wherein the mounting plate includes tabs engaging the sidewall tabs.

9. The computer of claim 7 wherein the fingers are flexible.

10. The computer of claim 8 wherein the mounting plate includes an edge engaging the fingers.

11. The computer of claim 8 wherein the mounting plate includes a notch engaging the front wall.

12. The computer of claim 7 wherein the one flange and the mounting plate engage the sidewall and the other flange and the mounting plate engage the fingers.

13. A method of assembling two disk drives to a computer chassis, comprising the steps of:

mounting a bracket on the chassis, the bracket having a disk mounting surface;

mounting a plate on the bracket, the plate being spaced from the disk mounting surface, supporting one side of the bracket and an adjacent side of the plate by tabs extending from the chassis;

supporting another side of the bracket and another adjacent side of the plate by fingers extending from the chassis, mounting a first disk drive between the disk mounting surface and the plate; and mounting a second disk drive on the plate.

14. A computer chassis comprising:

a base wall and a plurality of upright walls;

a bracket including a base plate and a pair of upright side plates, each side plate having a flange thereon;

a mounting plate, one side portion of the mounting plate and a first one of the flanges being supported by a first one of the upright walls, an opposite side portion of the mounting plate and a second one of the flanges being supported by a second one of the upright walls; and one of the first and second walls including a flexible finger engaging the bracket and mounting plate.

* * * * *

UNITED STATES PATENT AND TRADEMARK OFFICE
CERTIFICATE OF CORRECTION

PATENT NO.   : 5,768,099  
DATED        : June 16, 1998  
INVENTOR(S)  : Timothy Radloff et al.

Page 1 of 1

It is certified that error appears in the above-identified patent and that said Letters Patent is hereby corrected as shown below:

<u>Column 2,</u>  
Line 54, after "slot", insert -- . --.

<u>Column 3,</u>  
Line 60, after "FIG." replace 8 with -- 3 --.

<u>Column 4,</u>  
Line 65, after "plate", replace 84 with -- 34 --.

Signed and Sealed this

Nineteenth Day of March, 2002

Attest:

JAMES E. ROGAN  
*Director of the United States Patent and Trademark Office*

*Attesting Officer*